(12) United States Patent
Blase

(10) Patent No.: US 7,500,346 B2
(45) Date of Patent: Mar. 10, 2009

(54) ENERGY GUIDING CHAIN

(75) Inventor: Gunter Blase, Bergisch Gladbach (DE)

(73) Assignee: Igus GmbH, Cologne (DE)

( * ) Notice: Subject to any disclaimer, the term of this patent is extended or adjusted under 35 U.S.C. 154(b) by 0 days.

(21) Appl. No.: 11/738,143

(22) Filed: Apr. 20, 2007

(65) Prior Publication Data

US 2007/0246599 A1    Oct. 25, 2007

(30) Foreign Application Priority Data

Apr. 21, 2006 (DE) .................. 20 2006 006 640 U

(51) Int. Cl.
*F16G 13/00* (2006.01)
*F16G 15/10* (2006.01)

(52) U.S. Cl. .......................... 59/78.1; 248/49

(58) Field of Classification Search ............ 59/78.1; 248/49, 51
See application file for complete search history.

(56) References Cited

U.S. PATENT DOCUMENTS

| | | |
|---|---|---|
| 6,156,974 A | 12/2000 | Blase |
| 6,425,238 B1 | 7/2002 | Blase |
| 6,612,104 B2 * | 9/2003 | Blase .................. 59/78.1 |

FOREIGN PATENT DOCUMENTS

| | | |
|---|---|---|
| DE | 20 2006 006 645 | 7/2006 |
| DE | 20 2006 006 665 | 7/2006 |
| GB | 1 444 307 | 7/1976 |
| WO | WO9730299 | 8/1997 |
| WO | WO9740289 | 10/1997 |
| WO | 9957457 | 11/1999 |

OTHER PUBLICATIONS

German Search Report dated Aug. 14, 2007, received in corresponding priority Application No. DE 20 2006 006 640.3, 4 pgs.
PCT Search Report dated Sep. 11, 2007, received in corresponding International Application No. PCT/DE07/00676, 3 pgs.

* cited by examiner

*Primary Examiner*—David B Jones
(74) *Attorney, Agent, or Firm*—Grossman, Tucker, Perreault & Pfleger, PLLC

(57) ABSTRACT

On an energy guiding chain for guiding hoses, cables and the like, where the upper strand rests on the lower strand and rollers (5, 6) are provided on at least some chain links of the upper strand and/or the lower strand, which can roll on running surfaces (9, 10) provided on the chain links of the opposite strand and which, on their running surface, display a number of spaced peripheral guide grooves that can be engaged by the crests (13, 14) of the rollers of the opposite strand, it is envisaged, in order to facilitate traversing of the chain, that the running surfaces display spaced longitudinal slits that allow the crests of the roller profile to pass through, where the webs (17, 18) between the longitudinal slits cover the guide grooves on the side facing the other strand, such that the crests of the rollers of the other strand can roll on the webs.

7 Claims, 5 Drawing Sheets

ENERGY GUIDING CHAIN

The invention relates to an energy guiding chain according to the generic part of the main claim.

An energy guiding chain of this kind is known, for example, from international patent application WO 99/57457. On its side straps, the energy guiding chain disclosed there has rollers whose running surfaces display several circumferential guide grooves that are spaced apart and have a preferably trapezoidal cross-section. The crests next to the grooves of the rollers of the opposite strand can engage the guide grooves, resulting in guidance in the longitudinal direction and a simultaneous offset of the upper strand relative to the lower strand in the transverse direction.

In this embodiment, not only do the rollers roll, but the flanks of the intermeshing crests also slide on each other. This causes increased friction, particularly due to the weight of the upper strand, which presses its guide rollers with their crests into the guide grooves of the rollers of the lower strand. This sliding friction makes traversing of the energy guiding chain in the longitudinal direction more difficult. Moreover, the upper strand is lifted slightly when rollers meet. If the roller-bearing chain links are evenly distributed on a relatively long chain, e.g. one such chain link per meter on a 50 m chain, the simultaneous lifting of the upper strand can call for substantial forces, these necessitating a powerful drive, resulting in unsteady movement and possibly leading to an undesirable lateral offset of the upper strand.

The object of the invention is to design an energy guiding chain, with rollers provided with guide grooves on the running surfaces, in such a way that traversing in the longitudinal direction is facilitated.

This object is solved by an energy guiding chain according to claim 1.

By covering the guide grooves by means of webs located between the longitudinal slits for passage of the roller crests, the crests of one strand can no longer reach far enough into the guide grooves to contact the flanks of the crests of the other strand. Instead, they roll on the webs. The guiding action is preserved in this context since, in the event of an offsetting lateral force possibly occurring, the crests of the rollers of the opposite strands can touch, thus limiting the offset. The weight of the upper strand is absorbed by the webs and can no longer increase the friction.

The number of guide grooves can be one or more, depending on the size of the chain links and the forces to be absorbed. Rollers with one to three guide grooves are preferred.

The rollers can be of one-piece design, where the guide grooves can be formed during molding or incorporated subsequently. In a preferred embodiment, several rollers, e.g. of disk-shaped design, are arranged axially next to each other, either resting against each other or being spaced apart. These rollers can be mounted independently of each other, e.g. in ball bearings.

In a preferred embodiment, the rollers are each provided with one guide groove, as a result of which two crests are formed on each, and two longitudinal slits are present in the running surface.

In another preferred embodiment, several, preferably two or three, guide grooves, which are bordered by a number of crests that is one greater in each case, and the corresponding number of longitudinal slits are provided.

In a further preferred embodiment, two or more rollers are present, whose axes of rotation coincide and which either lie against each other in contacting fashion or are spaced apart from each other. The rollers can have a thickness that decreases in the radially outward direction, such that they only contact each other in the region of the axis, and form the guide grooves in the peripheral area. If the rollers are also spaced apart in the vicinity of the axis, a guide groove is formed even if they are of cylindrical design.

Particularly preferred is an embodiment with two rollers and one guide groove formed by them.

In a further preferred embodiment, longitudinal channels are provided in the running surfaces, extending in the longitudinal direction of the energy guiding chain in continuation of the longitudinal slits. This achieves an additional guiding action without any major frictional losses occurring.

In a further embodiment, the guiding action is further aided by guide elements on the cross-members of the chain links. These can advantageously be intermeshing, saw-like structures on the outer sides of cross-members lying opposite each other in the lower and upper strands, the teeth of which can be pointed in the longitudinal direction of the energy guiding chain, so that they can run into the corresponding intermediate spaces without blocking during traversing.

Further advantages of the energy guiding chain according to the invention with covering of the guide grooves are the reduction of noise generation during traversing of the chain, and reliable guidance of the upper strand without any risk of unintentional lateral deflection.

The practical examples presented below are intended to further illustrate the invention, and they are described in reference to the drawings.

Figure 1:
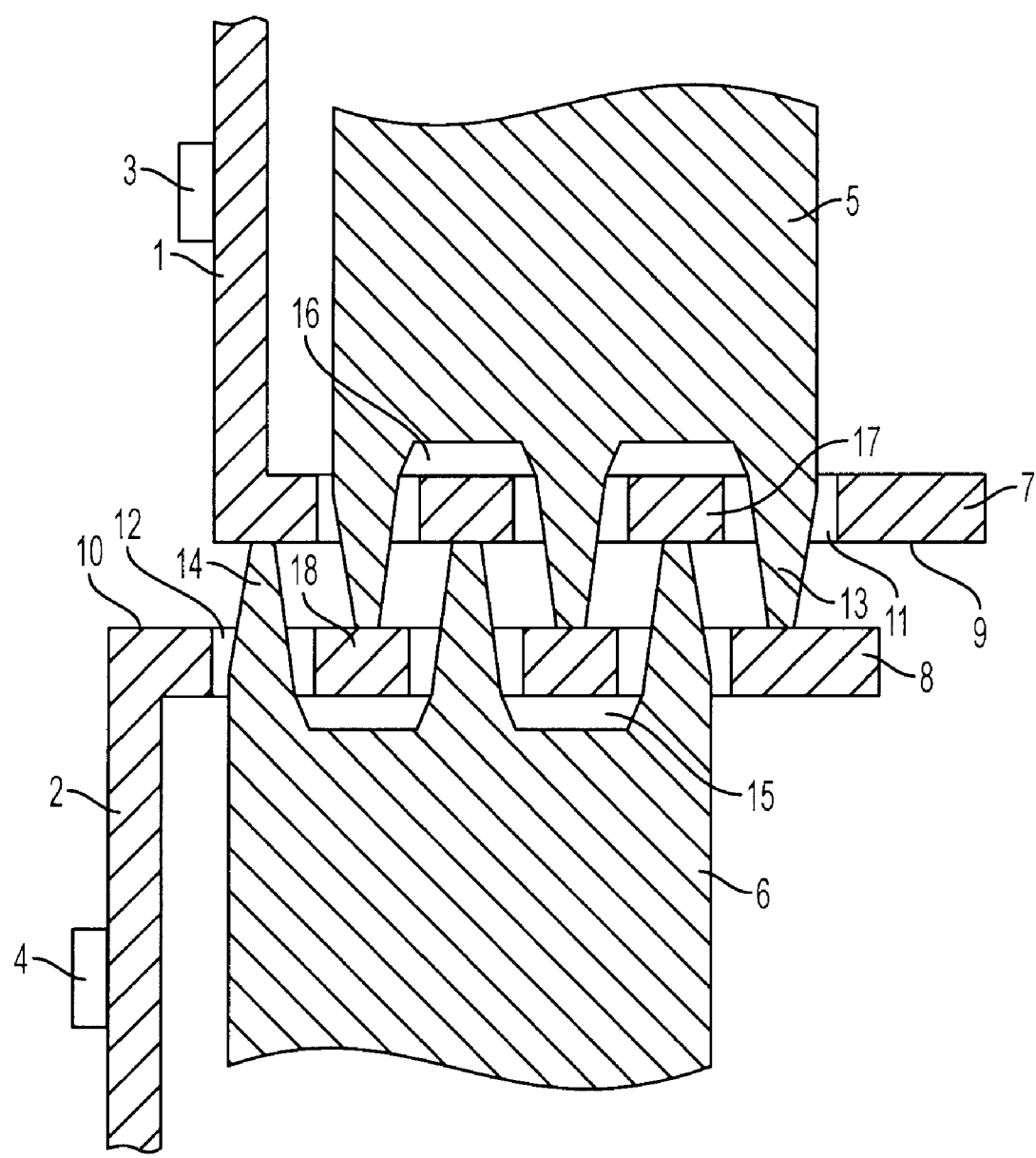
FIG. 1 shows a schematic partial cross-section through a strap section of an energy guiding chain according to the invention.

FIG. 1 shows a partial section of the opposite parts of side straps 1 of the upper strand, and 2 of the lower strand of an energy guiding chain. Pins 3 and 4 are provided for fastening cross-members (not shown), which face towards the interior of the chain links formed from side straps and cross-members, and at the remote ends of which side straps (not visible) are again mounted. Mounted on the sides of the side straps facing away from pins 3, 4 are rollers 5, 6, which can rotate in the known manner about horizontal axes (not shown). On their peripheral surfaces, the rollers display guide grooves 15, 16, which are flanked by crests 13, 14. The side straps furthermore display wider areas 7, 8 on the opposite edges. The opposite surfaces of the wider areas serve as running surfaces 9, 10 for rolling of rollers 5, 6. Provided in these wider areas are longitudinal slits 11, 12, which allow the crests of the rollers to pass through and border webs 17, 18, which run in the longitudinal direction. When the upper strand lies as closely as possible on the lower strand, crests 13, 14 of the guide rollers rest on webs 17, 18 and do not touch. When the energy guiding chain is traversed, the crests of the rollers roll on the webs, or on the running surfaces, without any sliding friction occurring between them.

Figure 2:
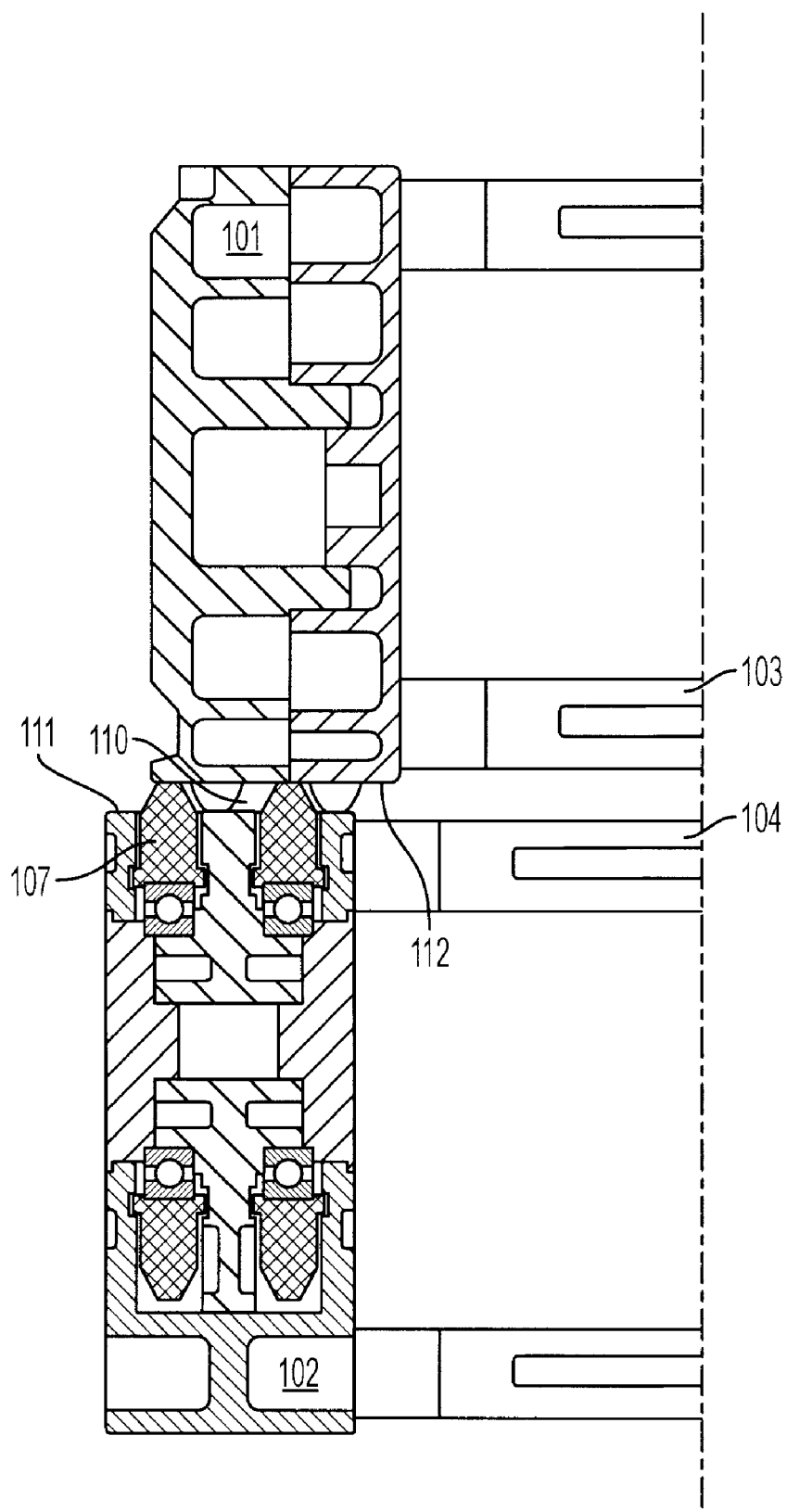
FIG. 2 shows a cross-section of a strap section of another embodiment according to the invention.
Figure 3:
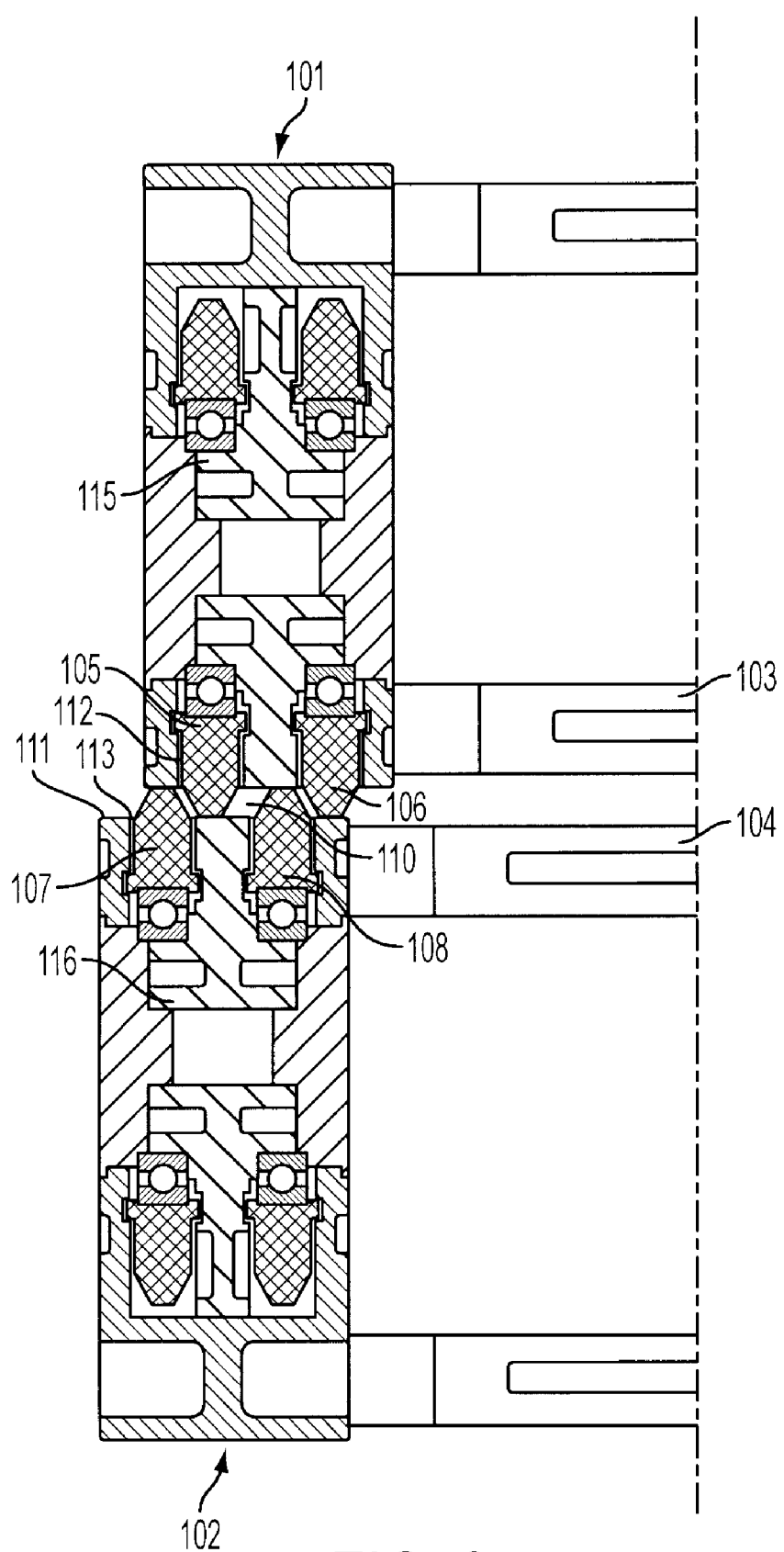
FIG. 3 shows a cross-section of the embodiment according to FIG. 2 in a different operating state.

FIGS. 2 and 3 show cross-sections through a pair of side straps 101, 102, which belong to the upper and lower strand, respectively. Pins 103, 104 are again used for fastening cross-members. Mounted in ball bearings in each side strap, at a distance from each other and with a common axial direction, are two rollers on roller carriers 115, 116. The side surfaces of side straps 101, 102 that face each other form the running surfaces 111 for the rollers. Provided in the running surfaces are longitudinal slits 112, 113, which allow the radially outer sections of the rollers to project to the outside. As crests of the roller system, these outer sections of the two rollers of each and every side strap border a guide groove 110. FIG. 2 shows this embodiment in a state where the rollers are remote from each other and each roll on running surfaces 111. In contrast, the rollers are opposite each other in the state shown in FIG. 3, rolling on the webs between slits 112, 113. It can be seen that there is again no contact between the rollers during traversing, and therefore no sliding friction occurs between them.

Figure 4:
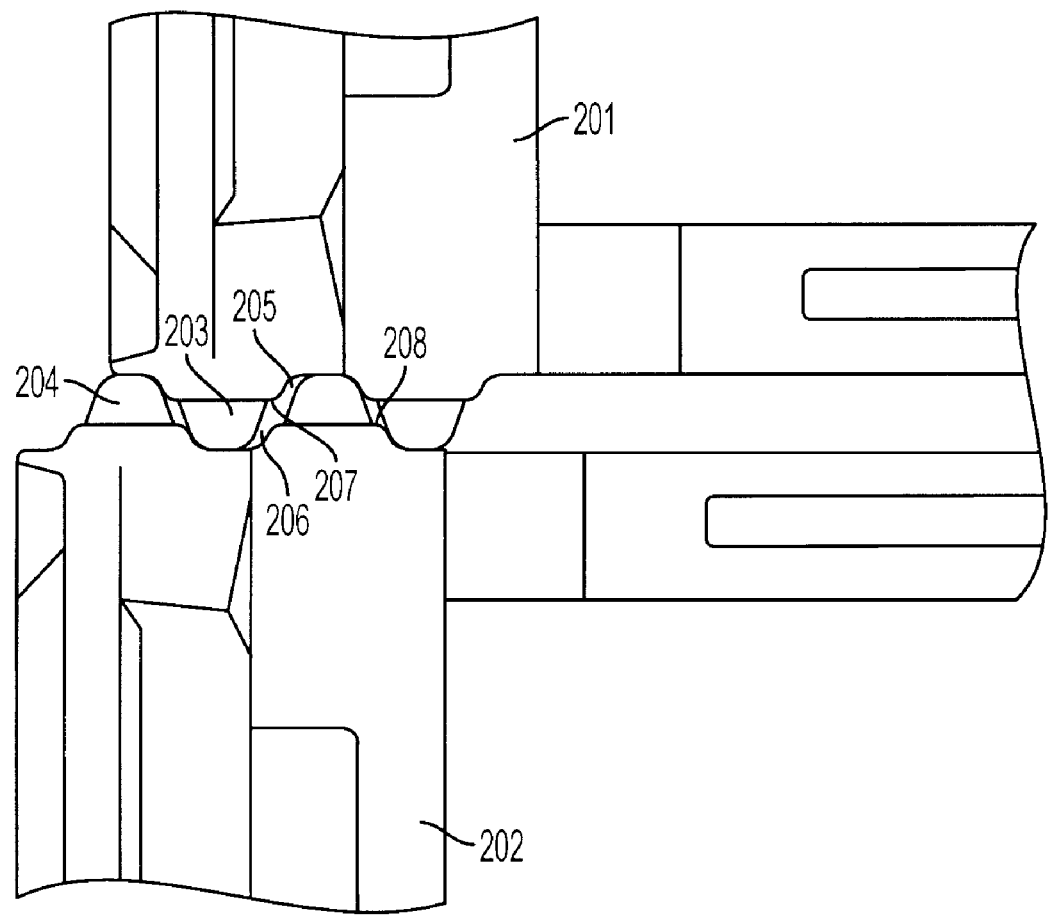
FIG. 4 shows a side view of a strap section of a third embodiment.

FIG. 4 shows a side view of a further embodiment according to the invention. Formed in side surfaces 207, 208 of side straps 201, 202 in this case are longitudinal channels 205, 206, in which rollers 203, 204 roll. The longitudinal channels extend in the direction of, and following on from, the longitudinal slits, not shown here, for passage of the rollers. This additional guidance of the rollers in the longitudinal channels likewise takes place almost entirely without sliding friction.

Figure 5:
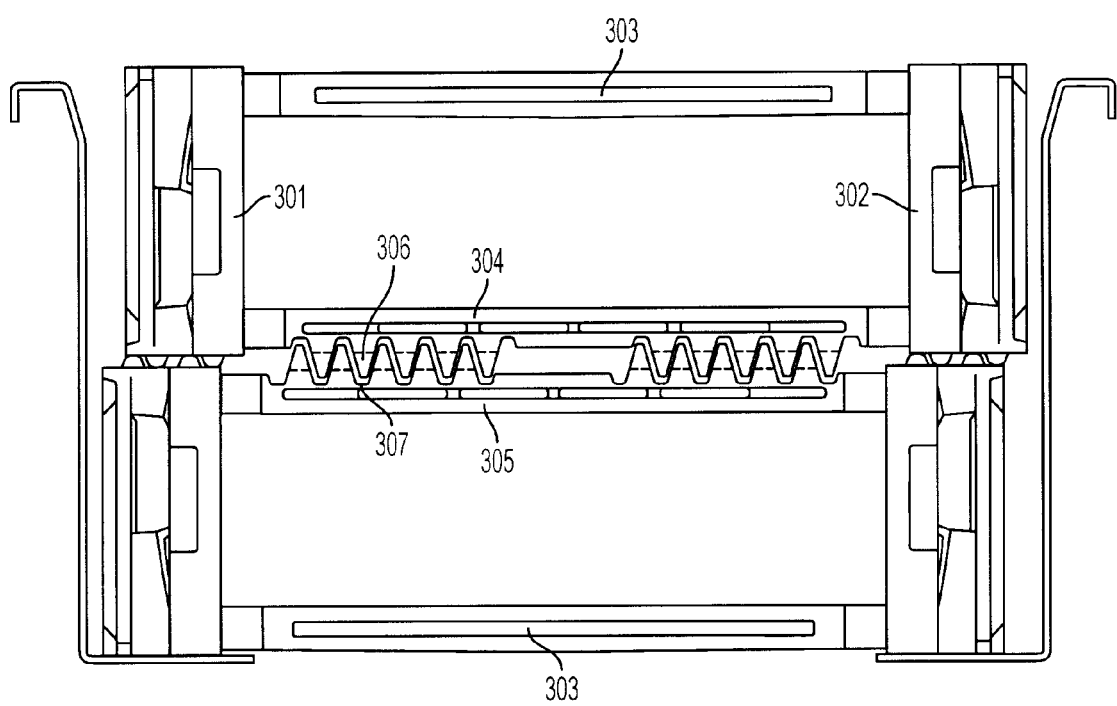
FIG. 5 shows a cross-section of a fourth embodiment.

FIG. 5 shows a fourth embodiment of the energy guiding chain according to the invention, as a front view of two chain links in the lower and upper strand. The chain links consist of side straps 301, 302 and cross-members 303, 304, 305. The outer side of cross-members 304, 305, which face each other, displays a saw-like structure. When passing through, teeth 306 of the structure are guided by grooves 307, this avoiding lateral offsetting of the upper strand.

LIST OF REFERENCE NUMBERS

1, 2 Side strap
3, 4 Pin for cross-member
5, 6 Roller
7, 8 Wider area at the edge
9, 10 Running surface
11, 12 Longitudinal slit
13, 14 Crest of the roller
15, 16 Guide groove of the roller
17, 18 Longitudinal web
101, 102 Side strap
103, 104 Pin for cross-member
105, 106 Roller
107, 108 Roller
110 Guide groove
111 Running surface
113, 114 Longitudinal slit
115, 116 Roller carrier
201, 202 Side strap
203, 204 Roller
205, 206 Longitudinal channel
207, 208 Side surface of the side strap
301, 302 Side strap
303 Cross-member
304, 305 Cross-member with saw structure
306 Tooth
307 Groove

The invention claimed is:

1. Energy guiding chain for guiding hoses and cables comprising;
a number of chain links connected to each other in articulated fashion, which are formed by mutually parallel side straps and cross-members connecting said side straps, where the energy guiding chain can be traversed in such a way that it forms an upper strand, a lower strand, and a deflection zone connecting them, where the upper strand rests on and is opposite the lower strand,
and rollers provided on at least some chain links of the upper strand and/or the lower strand, said rollers having crests, said rollers being arranged such that, when the energy chain moves, they can roll on running surfaces provided on the chain links of the opposite strand, and including one or more, peripheral guide grooves in said running surfaces, which can be engaged by the crests of the rollers of the opposite strand,
characterized in that the running surfaces display spaced longitudinal slits that allow the crests of the roller profile to pass through, where webs between the longitudinal slits cover the guide grooves, such that the crests of the rollers of the opposite strand can roll on the webs.

2. Energy guiding chain according to claim 1, characterized in that several guide grooves are present.

3. Energy guiding chain according to claim 1, characterized in that the one or more guide grooves are formed by two or more rollers arranged axially against each other or spaced apart.

4. Energy guiding chain according to claim 3, characterized in that two rollers form a guide groove.

5. Energy guiding chain according to claim 1, characterized in that guide channels are provided in the running surfaces and extend in the direction of the longitudinal slits, in which the crests of the rollers can run.

6. Energy guiding chain according to claim 1, characterized in that guide elements are present on the cross-members of the chain links.

7. Energy guiding chain according to claim 6, characterized in that saw-like structures are present on the outer sides of said cross-members, as guide elements that can engage each other during traversing.

* * * * *